United States Patent [19]

Belfield et al.

[11] 4,190,227

[45] Feb. 26, 1980

[54] VIBRATION ISOLATOR AND METHOD FOR MANUFACTURING SAME

[75] Inventors: Robert E. Belfield, Sayville; Chester L. Gilbert, Forest Hills; Euland M. Bickham, North Babylon, all of N.Y.

[73] Assignee: Aeroflex Laboratories, Inc., Plainview, N.Y.

[21] Appl. No.: 707,589

[22] Filed: Jul. 22, 1976

[51] Int. Cl.² ........................................... F16L 15/04
[52] U.S. Cl. ...................................... 248/636; 248/618
[58] Field of Search .................. 248/358 A, 20, 15; 267/148, 160

[56] References Cited

U.S. PATENT DOCUMENTS

| | | | |
|---|---|---|---|
| 2,873,109 | 2/1959 | Hartenstein et al. | 267/165 |
| 2,972,459 | 2/1961 | Kerley, Jr. et al. | 248/20 |
| 3,204,911 | 9/1965 | Lawrence et al. | 267/148 X |
| 3,204,912 | 9/1965 | Lawrence et al. | 267/148 X |
| 3,204,913 | 9/1965 | Lawrence et al. | 267/148 X |
| 3,360,225 | 12/1967 | Camossi | 267/148 X |
| 3,596,865 | 8/1971 | Camossi | 248/358 A |

FOREIGN PATENT DOCUMENTS

| | | | |
|---|---|---|---|
| 1560072 | 3/1968 | France | 248/358 A |
| 405832 | 1/1960 | Switzerland | 248/358 A |
| 1129810 | 10/1968 | United Kingdom | 248/358 A |

*Primary Examiner*—J. Franklin Foss
*Attorney, Agent, or Firm*—Blum, Kaplan, Friedman, Silberman & Beran

[57] ABSTRACT

An isolator for supporting a load on a part, such as a vehicle part, which is subject to vibrations, in a manner isolating the load from the vibrations. The isolator includes a pair of elongated bar structures for respective coupling to the load and the part, the bar structures being substantially parallel to and spaced from each other and interconnected by a plurality of spring structures fixed to and distributed longitudinally along opposed sides of the bar structures. Each spring structure includes an elongated portion respectively fixed to the bar structures and extending therebetween along a path including at least a curved portion. The spring structures are initially in the form of substantially straight wire cables or ropes and are arranged substantially parallel to and spaced from each other in a mold in which the bar structures are molded around the spring structures so that the latter are fixed to the bar structures by being embedded therein. The ends of the spring structures are molded to a pair of elongated plastic bodies which, together with a retainer, define one bar structure, while intermediate portions of the spring structures are molded to an intermediate plastic body which defines the second bar structure.

19 Claims, 6 Drawing Figures

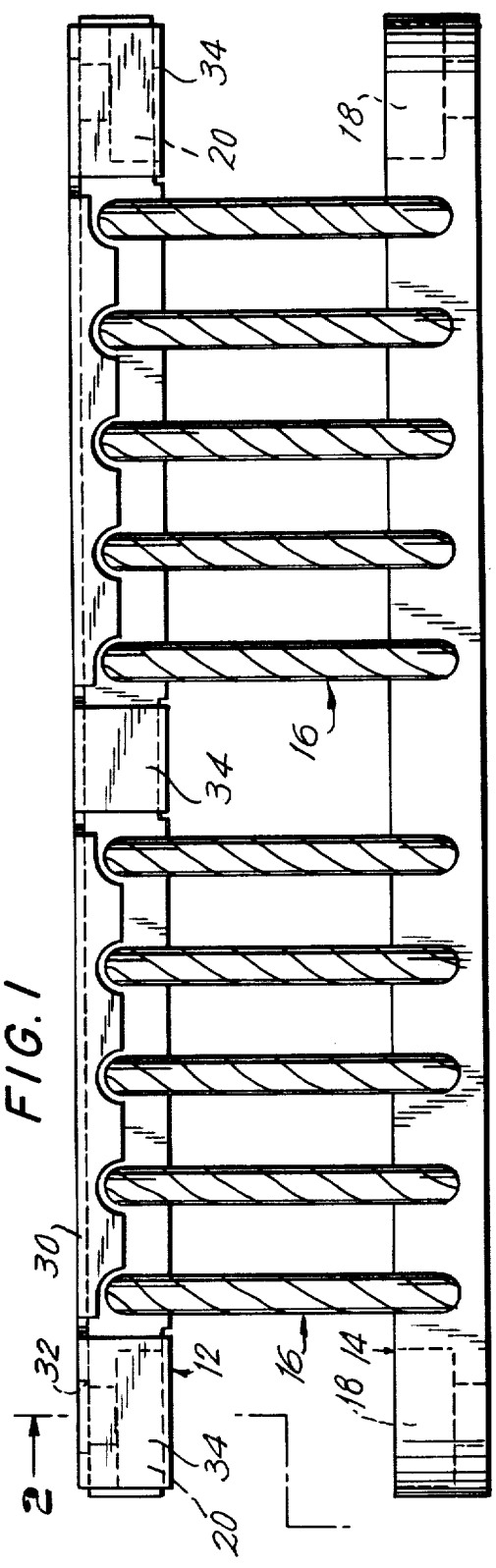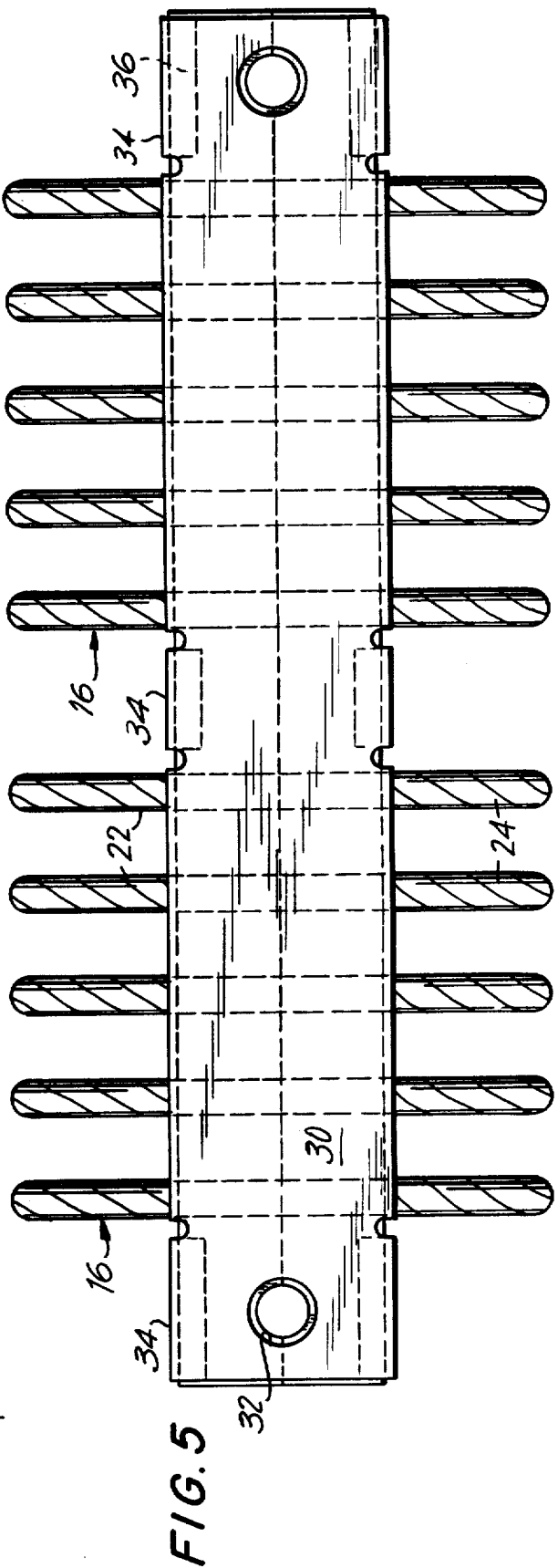

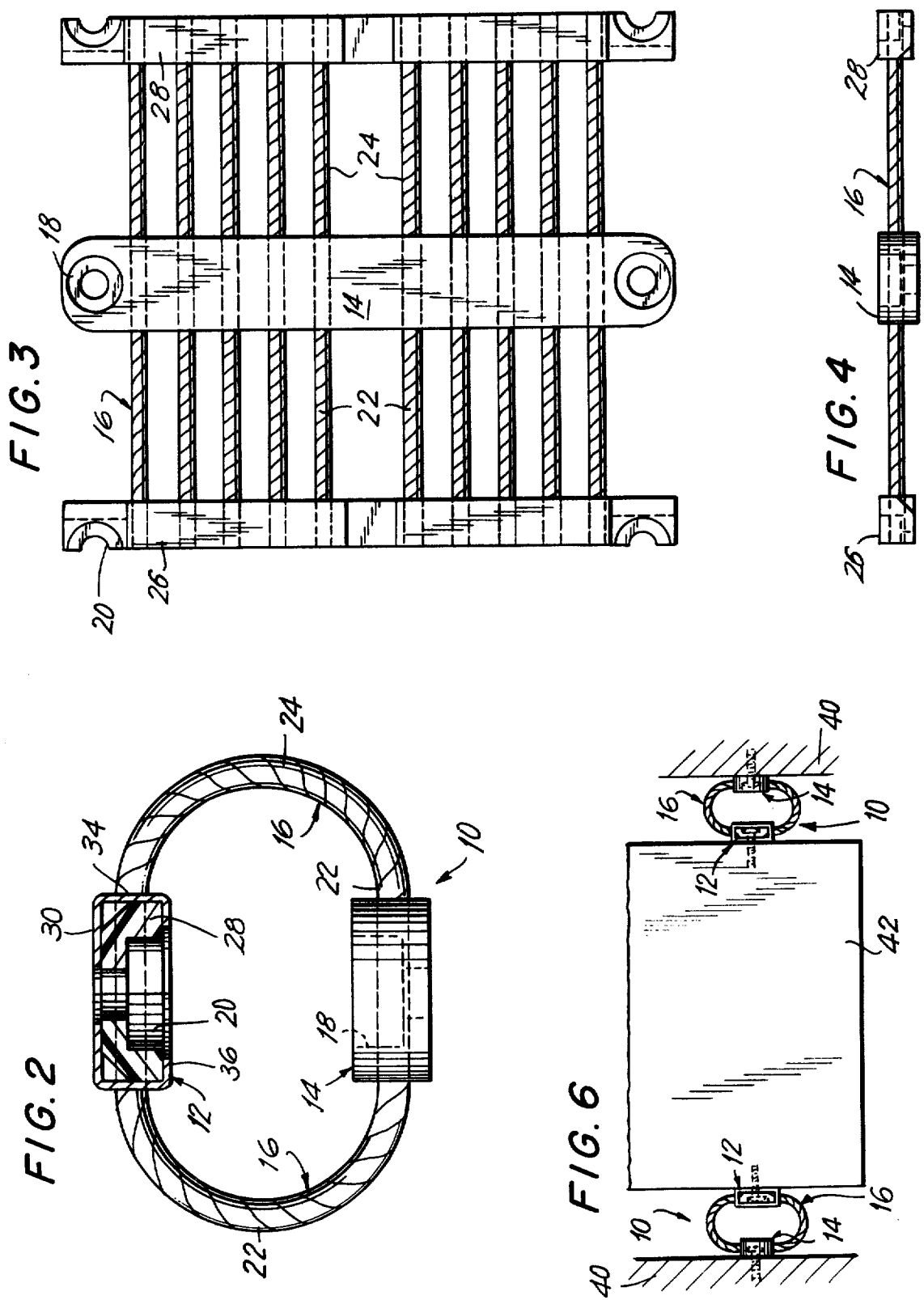

VIBRATION ISOLATOR AND METHOD FOR MANUFACTURING SAME

BACKGROUND OF THE INVENTION

The present invention relates to isolators and methods for manufacturing the same.

In particular, the present invention relates to isolators of the type used for supporting loads of various types on a part which is subject to vibrations, the isolators serving to insulate the load from the vibrations.

Thus, in the case of aircraft, for example, it is necessary to support sensitive instruments or the like in such a way that they will be insulated from the vibrations of the aircraft. For this purpose isolators are used, these isolators serving to damp the vibrations of the vehicle before these vibrations can reach the instrument connected by way of the isolator to the vehicle.

Although isolators of the above general type are known, the presently used isolators are relatively complex and expensive, requiring the use of a relatively large number of components which are difficult to assemble and mount.

SUMMARY OF THE INVENTION

It is accordingly a primary object of the present invention to provide an isolator which is much simpler and less expensive than conventional isolators in use at the present time.

Also it is an object of the present invention to provide an isolator structure which not only is simple and inexpensive but which also is relatively easy and convenient to connect both to a part such as a vehicle part and to the load which is to be supported.

In addition, it is an object of the present invention to provide a method for quickly and inexpensively manufacturing an isolator.

The isolator of the invention includes a pair of elongated substantially coextensive bar means of substantially the same shape and size respectively situated in substantially parallel planes and being spaced from each other. A plurality of spring means are distributed along both sides of and connected to the pair of bar means, each spring means extending between said bar means along a path including at least a curved portion. One of these bar means is adapted to be connected with a part such as a vehicle part, while the other of the bar means is adapted to be connected with the load.

According to the method of the invention the spring structures are initially in the form of substantially straight parallel lengths of wire rope or cable situated in a suitable mold in which a pair of bar portions are molded at the ends of the wire cables so that these ends are embedded in the pair of bar portions, while at the same time an intermediate bar is molded between the pair of bar portions, extending parallel thereto, and in which intermediate portions of the wire cables are embedded. Upon removal of the molded bar portions and intermediate bar member with the springy wire cables from the mold, the pair of bar portions in which the ends of the wire cables are embedded are situated next to each other, while the wire cables are curved from each side of the intermediate molded bar, and the bar portions are held together by a retainer, so that in this way it is possible quickly and inexpensively to manufacture the isolator of the invention.

BRIEF DESCRIPTION OF THE DRAWINGS

The invention is illustrated by way of example in the accompanying drawings, which form part of this application and in which:

FIG. 1 is a side elevation of an insulator according to the present invention;

FIG. 2 is a partly sectional transverse view of the structure of FIG. 1 taken along line 2—2 of FIG. 1 in the direction of the arrows;

FIG. 3 illustrates the structure of FIGS. 1 and 2, without a retainer, as it appears when removed from a mold;

FIG. 4 is an end view of the structure of FIG. 3;

FIG. 5 is a top plan view of the structure of FIG. 1; and

FIG. 6 is a side elevational view of a load supported on a part by means of the isolators of the invention.

DESCRIPTION OF THE PREFERRED EMBODIMENTS

Referring now to the drawings, it will be seen that the isolator 10 of the present invention, shown in FIGS. 1 and 2, includes a pair of bar means 12 and 14 which are of substantially the same size and configuration and which are substantially coextensive with each other, the pair of bar means 12 and 14 being spaced from each other and situated in substantially parallel planes as illustrated in FIGS. 1 and 2. A plurality of spring means 16 are fixed to the pair of bar means 12 and 14 so as to support them for yieldable springy movement toward and away from each other and parallel to each other while they remain substantially in parallel planes. The bar means 14, for example, is adapted to be fixed to a vehicle part such as part of an aircraft, while the bar means 12 is adapted to be fixed with the load. Thus it will be seen that the elongated bar means 14 is formed at its opposed end regions with suitably countersunk bores 18 through which fasteners such as suitable bolts or the like are adapted to extend for fixing the bar 14 to part of a vehicle. In the same way, the bar means 12 is formed at its opposed end regions with a pair of suitably countersunk bores 20 passing therethrough and adapted to receive suitable fasteners such as suitable bolts or the like for fastening the bar means 12 to the load which is to be supported.

The plurality of spring means 16 are respectively situated in planes which are substantially parallel to each other and substantially normal to the planes in which the pair of bar means 12 and 14 are located. Each spring means 16 includes, on respective sides of the pair of bar means 12 and 14, spring portions 22 and 24, each extending between the bar means along a substantially curved path. Thus, one series of spring portions 22 is situated on one side of the pair of bar means while another series of these spring portions 24 is situated on the other side of the pair of bar means, and each of one of the series of spring portions on one side of the pair of bar means is situated in a plane common to one of the series of spring portions on the other side of the pair of bar means.

In the illustrated structure, each of the plurality of spring means 16 is in the form of a single elongated continuous springy member extending without interruption at an intermediate portion thereof through the bar means 14 and respectively having a pair of opposed ends fixed to a pair of elongated bar portions which form part of the bar means 12. Thus, the bar means 12 includes a pair of elongated bar portions 26 and 28 which are situated next to each other, being held together by a retainer means 30 described in greater detail below. Each spring means 16 is in the form of an elongated wire rope or cable, one end of which is fixed with the bar portion 28, the cable extending from the bar portion 28 to the right, as viewed in FIG. 2, and then around along the semicircular spring portion 24 to the bar means 14 through which the wire cable or rope extends without interruption to form the opposed semicircular spring portion 22 which terminates in an end fixed with the bar portion 26. Said rope or cable may be formed of steel wire preformed into a stranded rope. Each spring means 16 may be formed of two lengths of wire rope laid end to end in the region of bar means 14.

The method according to which the isolator 10 is manufactured is illustrated in FIGS. 3 and 4. Thus, the series of spring means 16 are initially in the form of straight wire cables or ropes and due to their own inherent resiliency tend to assume the straight condition illustrated in FIGS. 3 and 4. These elongated straight spring structures 16 are all of the same length and are arranged parallel to each other in a mold in the manner illustrated in FIG. 3. While thus situated in a suitable mold, the elongated bar means 14 is molded, as by injection molding, and the countersunk bores 18 also may be molded simultaneously by way of suitable mold design or these bores 18 may be subsequently formed upon removal of the bar 14 and the remaining structure from the mold. The bar 14 is molded in such a way that the intermediate central portions of the several springy wire cables or ropes defining spring means 16 become embedded in the bar 14 so that in this way the latter is fixed with the spring means 16 while being molded around the latter.

At the same time the pair of opposed elongated bar portions 26 and 28 are simultaneously molded in such a way that the ends of the wire cables or ropes of spring means 16 become embedded in the pair of bar portions 26 and 28 which extend respectively along straight lines which are situated at the ends of the springy members 16, extending perpendicular thereto. These molded bar portions 26 and 28 may be molded in such a way that each will have one half of the countersunk bore 20 molded therein in the manner apparent from FiG. 3. Thus, as is apparent from FIGS. 3 and 4, the intermediate elongated molded bar 14 is of the same length and thickness as the bar portions 26 and 28 but is twice as wide as either one of these bar portions. The bar portions 26 and 28 as well as the intermediate bar 14 may be molded of any suitable thermoplastic material such as polyvinyl chloride, polystyrene, etc., and when set, these bar structures will be substantially rigid. Thus upon being removed from the mold the several spring means 16 will be rigidly fixed with the bar portions and the structure will have the condition illustrated in FIGS. 3 and 4.

In order to complete the structure it is only necessary to bring the pair of bar portions 26 and 28 into side-by-side relation so as to have with respect to each other the position apparent from FIG. 2. The result will be that the springy wire portions extending in opposed directions beyond the opposite sides of the bar portion 14 will assume the curvature illustrated in FIG. 2. The pair of bar portions 26 and 28 are held together by the retainer means 30.

This retainer means 30 is in the form of an elongated metallic channel member, one wall of which covers the outer faces of the bar portions 26 and 28 where they are directed away from the bar portion 14, as is apparent from FIG. 5. The elongated retainer 30 is formed adjacent its opposed ends with a pair of openings 32 respectively aligned with the countersunk bores 20 which are formed when the pair of bar portions 26 and 28 are joined together. The elongated retainer 30 has elongated side walls formed with substantially semicircular recesses for receiving portions of the spring means 16 as illustrated most clearly in FIG. 1. In addition, the channel member 30 has at its opposed ends and at an intermediate region elongated tongues extending from each side edge of the wall apparent in FIG. 5. These tongues 34 of the channel member 30 extend completely across and beyond the opposed outer side faces of the bar portions 26 and 28, and at their free ends the tongues 34 are bent inwardly against the respective surfaces of the bar portions 26 and 28 which are directed toward the bar 14. The bar portions 26 and 28 preferably are formed with slight recesses at their outer side surfaces and at their surfaces directed toward the bar 14 in the construction shown in FIG. 2 for the purpose of receiving the tongues 34 and the inwardly bent ends 36 thereof.

It is thus apparent that once a molded structure as shown in FIGS. 3 and 4 is provided, it is a simple matter quickly and conveniently to locate the bar portions 26 and 28 next to each other and situate them in the retainer channel 30 which need only have the free ends 36 of the tongues 34 thereof bent inwardly toward each other so as to provide the complete isolator 10 of the invention.

The isolators 10 of the invention may be used, for example, in the manner shown schematically in FIG. 6. Thus, pairs of the bar means 14 of the pair of isolators 10 shown in FIG. 6 are fixed by suitable fasteners, such as bolts or screws passing through the bores 18, to opposed walls of a part 40; for example, an equipment rack mounted in a vehicle such as an aircraft. A load 42, such as an electronic instrument or the like, for example, is then fixed on opposed sides by suitable fasteners to the pairs of bar means 12, these fasteners of course passing through the bores 20. In this way the plurality of spring means 16 of the pair of isolators 10 shown in FIG. 6 will serve to damp any vibrations in the vehicle part 40 and prevent these vibrations from being transmitted to the instrument 42. Additional isolators can be secured to other walls of the load and corresponding walls of the part.

Thus, by way of the simple and inexpensive manufacturing method of the invention, it is possible to provide the simple inexpensive isolators 10 of the invention which are quickly and easily fastened between the part 40 and the load 42 so as to provide in this way an effective insulation of the load 42 from any vibrations to which the part 40 may be subjected.

It will thus be seen that the objects set forth above, among those made apparent from the preceding description, are efficiently attained, and since certain changes may be made in carrying out the above process, in the described product, and in the constructions set forth without departing from the spirit and scope of the invention, it is intended that all matter contained in the above description and shown in the accompanying drawings shall be interpreted as illustrative, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an isolator for supporting a load on a part, such as a vehicle part, which is subject to vibrations, in a manner insulating the load from the vibrations, a pair of elongated substantially coextensive bar means of substantially the same size and configuration respectively situated in alignment with each other and respectively being spaced from each other while being situated in substantial parallel planes, one of said bar means being adapted to be connected with the load while the other of said bar means is adapted to be connected with the part which is subject to vibrations, and a plurality of elongated spring means portions distributed longitudinally along each side of said pair of bar means and being fixed thereto, said plurality of spring means portions respectively being situated substantially in parallel planes which are substantially normal to the parallel planes in which said pair of bar means are located, each said spring means portion extending between said bar means along a path at least a portion of which is curved, one spring means portion on each side of said bar means being aligned in the same plane, each pair of spring means portions aligned in a single plane being integral with each other and formed from a single spring member, each of said spring members having an intermediate portion fixed to one of said bar means and a pair of ends fixed to the other of said bar means, said plurality of spring members interconnecting said pair of bar means for yieldable springy movement of one bar means with respect to the other, said intermediate portion of each spring member being situated substantially midway along the length thereof so that both of said spring means portions formed therefrom are substantially identical, both of said bar means being made of a molded material, said intermediate portions of said spring members being embedded in said one bar means during molding while said ends of each spring member are embedded in the other of said bar means during molding, said other bar means including a pair of separate elongated molded bodies in which said ends of each spring member are respectively embedded, said plastic bodies being situated in side-by-side relation and extending longitudinally of each other, and said other bar means including a retainer means operatively connected with said pair of molded bodies for retaining them connected to each other in side-by-side relation.

2. The combination of claim 1 and wherein said pair of bar means are straight and substantially rigid.

3. The combination of claim 1 and wherein said curved portion of each spring means portion is of a substantially semicircular configuration.

4. The combination of claim 1 and wherein said molded material is a plastic.

5. The combination of claim 1 and wherein said spring members are each in the form of an elongated wire cable.

6. In an isolator for supporting a load on a part, such as a vehicle part, which is subject to vibrations, in a manner insulating the load from the vibrations, a pair of elongated bar means situated in spaced facing relation, one of said pair of bar means including a pair of separate elongated bodies situated in side-by-side relation and extending longitudinally of each other and retainer means operatively connected with said pair of bodies for retaining them connected to each other in side-by-side relation; and a plurality of elongated spring means portions distributed longitudinally along each side of said pair of bar means and being fixed thereto, each said spring means portion extending between one of the bodies of said one bar means and the other of said bar means along a path at least a portion of which is curved, said plurality of spring means portions interconnecting said pair of bar means for yieldable springy movement of one bar means with respect to the other.

7. The combination of claim 6 and wherein said bar means are formed of a moldable material, the respective ends of each of said spring means portions being embedded in the material of the corresponding body of said one bar means and in the other of said bar means.

8. The combination of claim 7 and wherein said moldable material is a plastic.

9. The combination of claim 7 and wherein one spring means portion on each side of said bar means are together formed from a single spring member, an intermediate portion of said spring member being embedded in said other bar means and each end of said spring member being embedded in one of said bodies of said one bar means.

10. The combination of claim 9 and wherein said spring members are each in the form of an elongated wire cable.

11. The combination of claim 9 and wherein said pair of bar means are straight and substantially rigid.

12. The combination of claim 9 and wherein said curved portion of each spring means portion is of a substantially semicircular configuration.

13. The combination of claim 9 and wherein said intermediate portion of each spring member is situated substantially midway along the length thereof so that both said spring means portions formed therefrom are substantially identical.

14. The combination of claim 6 and wherein one spring means portion on each side of said bar means are formed from a single spring member, each of said spring members having an intermediate portion fixed to the other of said bar means and an end fixed to one of said bodies of said one bar means.

15. The combination of claim 14 and wherein said intermediate portion of said spring member is situated substantially midway along the length thereof so that both of said spring means portions formed therefrom are substantially identical.

16. The combination of claim 14 and wherein said spring members are each in the form of an elongated wire cable.

17. The combination of claim 14 and wherein said pair of bar means are straight and substantially rigid.

18. The combination of claim 14 and wherein said curved portion of each spring means portion is of a substantially semicircular configuration.

19. The combination of claim 14 and wherein the spring means portions defined by each spring member are aligned in a single plane, the planes defined by at least a portion of said spring members extending substantially parallel to each other.

* * * * *